(12) United States Patent
Cheng

(10) Patent No.: US 8,554,910 B2
(45) Date of Patent: Oct. 8, 2013

(54) METHOD AND DEVICE FOR PUSHING DATA

(75) Inventor: Yu Cheng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 13/520,578

(22) PCT Filed: Jul. 15, 2011

(86) PCT No.: PCT/CN2011/077192
§ 371 (c)(1),
(2), (4) Date: Jul. 9, 2012

(87) PCT Pub. No.: WO2012/016489
PCT Pub. Date: Feb. 9, 2012

(65) Prior Publication Data
US 2012/0284397 A1  Nov. 8, 2012

(30) Foreign Application Priority Data
Aug. 4, 2010  (CN) .......................... 2010 1 0249583

(51) Int. Cl.
*G06F 15/173* (2006.01)
(52) U.S. Cl.
USPC .......................................... 709/224; 709/218
(58) Field of Classification Search
USPC ...................... 709/224, 204–207, 217–219
See application file for complete search history.

(56) References Cited

U.S. PATENT DOCUMENTS

| | | | | |
|---|---|---|---|---|
| 7,200,801 B2* | 4/2007 | Agassi et al. | ................. | 715/202 |
| 7,346,668 B2* | 3/2008 | Willis | ........................... | 709/219 |
| 2002/0052873 A1* | 5/2002 | Delgado et al. | .................. | 707/7 |
| 2004/0064431 A1* | 4/2004 | Dorner et al. | ..................... | 707/1 |
| 2006/0069749 A1* | 3/2006 | Herz et al. | ..................... | 709/219 |
| 2010/0023394 A1 | 1/2010 | Yue et al. | | |
| 2010/0211568 A1* | 8/2010 | Chu et al. | ...................... | 707/732 |

FOREIGN PATENT DOCUMENTS

| CN | 101192235 A | 6/2008 |
|---|---|---|
| CN | 101193037 A | 6/2008 |
| CN | 101539941 A | 9/2009 |

OTHER PUBLICATIONS

International Search Report in international application No. PCT/CN2011/077192, mailed on Oct. 20, 2011.
English Translation of the Written Opinion of the International Search Authority in international application No. PCT/CN2011/077192, mailed on Oct. 20, 2011.

* cited by examiner

*Primary Examiner* — Ruolei Zong
(74) *Attorney, Agent, or Firm* — Oppedahl Patent Law Firm LLC

(57) ABSTRACT

The disclosure provides a method and device for pushing data and relates to the Internet. The method includes acquiring data which meet a predetermined condition, acquiring attributes of reading-performed-users that have browsed the data, and determining a common attribute of the reading-performed-users; selecting reading-not-performed-users that have the common attribute and have not browsed the data; and pushing the data to the reading-not-performed-users. The device includes a common attribute acquisition module, a reading-not-performed-user selection module and a pushing module. According to the method and device for pushing data provided by the embodiments of the disclosure, the reading-not-performed-users that have the common attribute and have not browsed the data may be determined based on the data that meet a predetermined condition and a common attribute of the reading-performed-users, and the data are pushed to the reading-not-performed-users. Thus, the reading-not-performed-users may acquire their interesting data accurately.

10 Claims, 2 Drawing Sheets

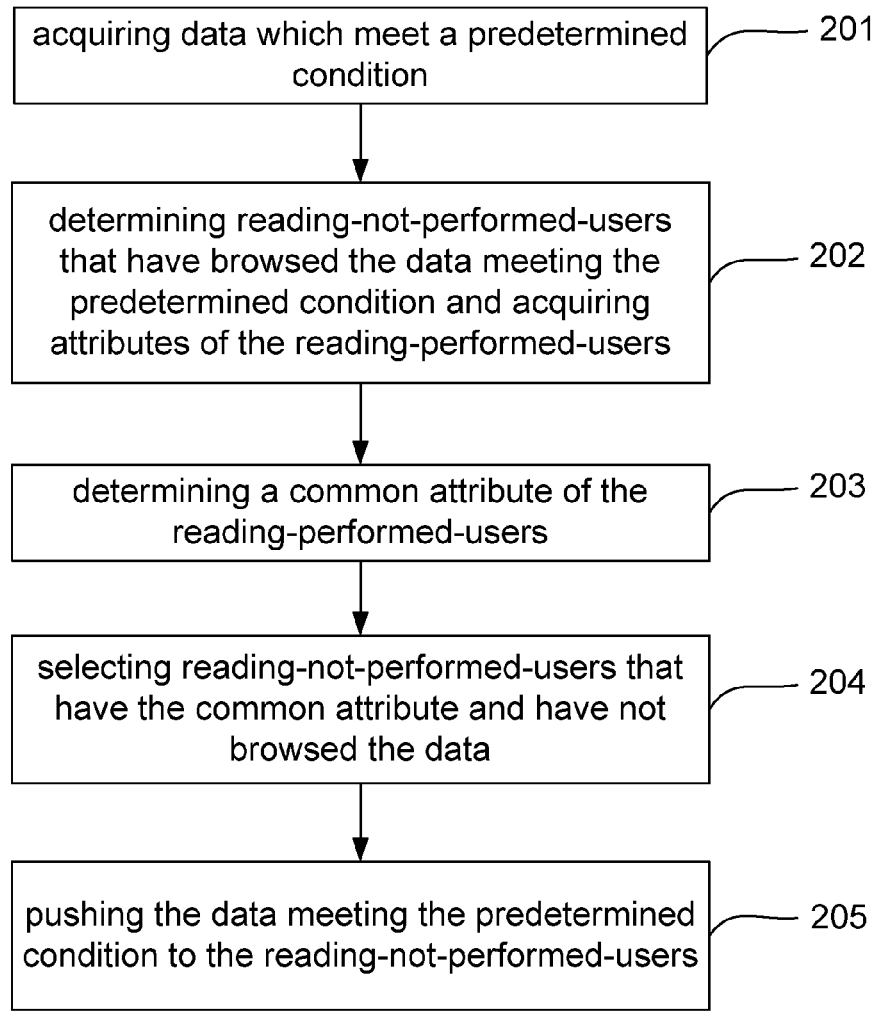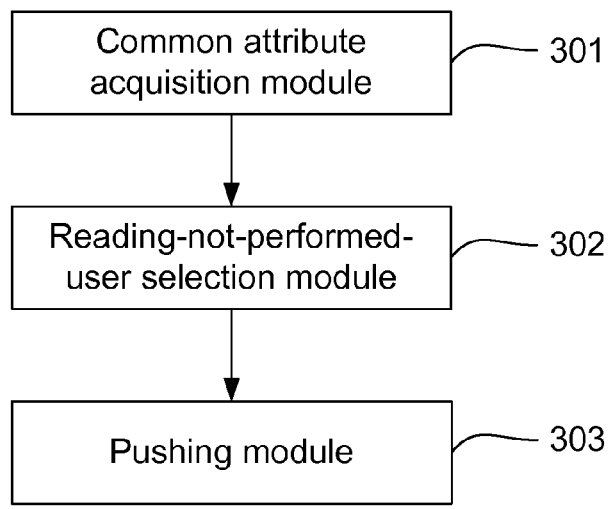

METHOD AND DEVICE FOR PUSHING DATA

TECHNICAL FIELD

The disclosure relates to the field of Internet technology, and in particular to a method and a device for pushing data.

BACKGROUND

With the continuous development of networks, Internet life has become a necessary part of people's lives. People are getting more involved in network activities. Therefore, the amount of network data is in explosive growth. When a user logs into a website everyday, the user would receive various data; besides data such as blogs, comments and uploaded pictures the user is interested in, there are some data the user is not interested in. How to push data a user is interested in to the user is always a focus of people's concerns and a problem which has been trying to solve.

Since a user often clicks the data he/she is interested in to browse and sometimes comments the data, the present data pushing technology generally classifies the hotness of the data according to the times the data are browsed and commented and pushes the data to all of the users according to the hotness of the data.

During the process of implementing the disclosure, the inventor has found that at least the following problems lie within the prior art:

during the process of pushing data, the data is pushed to all of the users depending on just the hotness of the data; the push logic is too simple; a user is often not interested in the received pushed data, and thus the user can not accurately acquire the data he/she is interested in.

SUMMARY

In order to enable users to acquire their interesting data accurately, the embodiments of the disclosure provide a device and method for pushing data. The technical solution will be described as follows.

An embodiment of the disclosure provides a method for pushing data. The method includes:

acquiring data which meet a predetermined condition, acquiring attributes of reading-performed-users that have browsed the data, and determining a common attribute of the reading-performed-users;

selecting reading-not-performed-users that have the common attribute and have not browsed the data; and pushing the data to the reading-not-performed-users.

Another embodiment of the disclosure provides a device for pushing data. The device includes:

a common attribute acquisition module, configured to acquire data which meet a predetermined condition, to acquire attributes of reading-performed-users that have browsed the data, and to determine a common attribute of the reading-performed-users;

a reading-not-performed-user selection module, configured to select reading-not-performed-users that have the common attribute and have not browsed the data; and a pushing module, configured to push the data to the reading-not-performed-users.

The beneficial effect brought by the technical solution of the embodiments of the disclosure is that an accurate pushing to the reading-not-performed-users may be implemented by selecting reading-not-performed-users that have the common attribute and have not browsed the data based on the data that meet a predetermined condition and a common attribute of the reading-performed-users and pushing the data to the reading-not-performed-users.

BRIEF DESCRIPTION OF THE DRAWINGS

In order to illustrate the technical scheme in the embodiment of the disclosure more clearly, accompanying drawings needed to describe the embodiment are simply introduced below; apparently, the accompanying drawings described hereinafter are only used for some embodiments of the disclosure; for ordinary skills in the art, other accompanying drawings also can be obtained based on these accompanying drawings on the premise of not offering creative labor.

FIG. 2 shows a flow chart of a method for pushing data provided in Embodiment 2 of the disclosure;

FIG. 3 shows a block diagram of a device for pushing data provided in Embodiment 3 of the disclosure.

DETAILED DESCRIPTION

Figure 1:
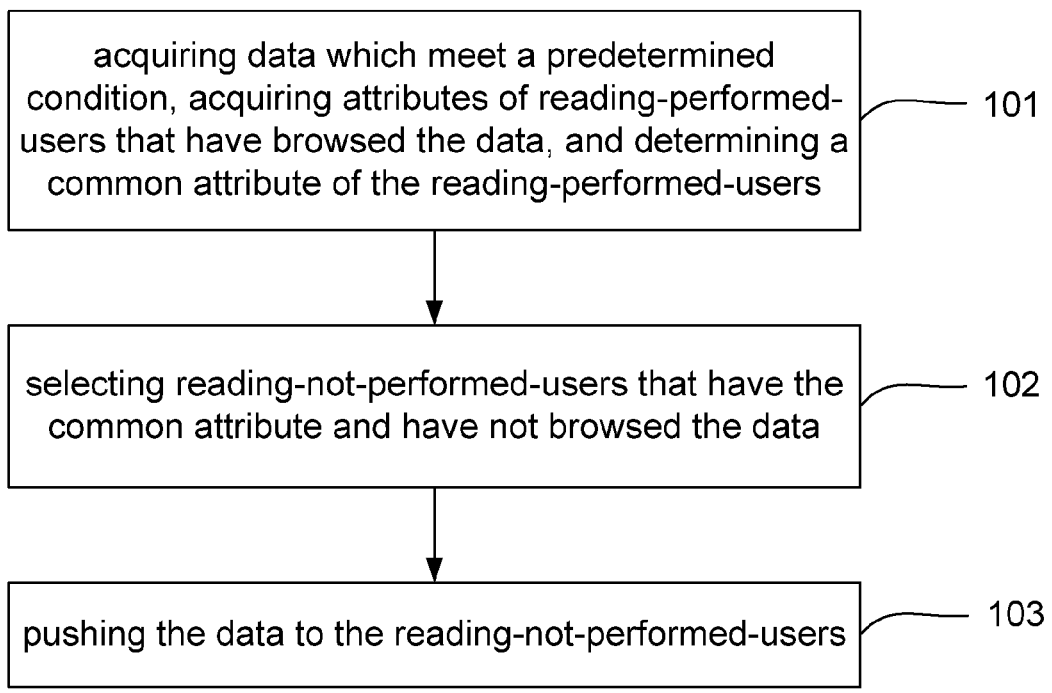
FIG. 1 shows a flow chart of a method for pushing data provided in Embodiment 1 of the disclosure.

To make the purpose, technical solution and advantages of the disclosure clearer, the implementations of the disclosure will be further described below in detail in conjunction with accompanying drawings.

Embodiment 1

Referring to FIG. 1, the embodiment of the disclosure provides a method for pushing data. The method specifically includes the following steps:

Step 101: acquiring data which meet a predetermined condition, acquiring attributes of reading-performed-users that have browsed the data, and determining a common attribute of the reading-performed-users;

Step 102: selecting reading-not-performed-users that have the common attribute and have not browsed the data;

Step 103: pushing the data to the reading-not-performed-users.

According to the method provided by the embodiment of the disclosure, the reading-not-performed-users that have the common attribute and have not browsed the data may be selected based on the data that meet a predetermined condition and a common attribute of the reading-performed-users, and the data are pushed to the reading-not-performed-users. Thus, an accurate pushing to the reading-not-performed-users may be implemented, enabling the reading-not-performed-users to accurately acquire their interesting data.

Embodiment 2

Referring to FIG. 2, the embodiment of the disclosure provides a method for pushing data. The method specifically includes the following steps:

Step 201: acquiring data which meet a predetermined condition;

Specifically, when a user logs into a website, a lot of data will be received. Each piece of data has a plurality of attributes, such as, the time instant when the data are generated, the number of users that have browsed the data, the number of times that the data have been browsed and the number of times that the data have been commented. Different predetermined conditions may be set according to different attributes and the embodiment of the disclosure does not make a limitation on the way of setting a predetermined condition. An embodiment of the disclosure is described under a predetermined condition consisting of the number of users that have browsed the data, the number of times that the data have been browsed and the number of times that the data have been commented during a period of time, for example.

In the embodiment of the disclosure, a valid time period T for each piece of data received by users, the number L of users that have browsed the data, the number of times N that the data have been browsed and the number of times M that the data have been commented are assigned weights p1, p2, p3 and p4 representing an attribute-based pushing degree respectively, wherein the valid time period T of data represents a period between the time instant when the data is generated and the current time, the four attribute weights meet p1+p2+p3+p4=1; the attribute weighted sum of each piece of data received by users is calculated as B=p1*T+p2*L+p3*N+p4*M, wherein the first W pieces of data among the data in descending order of attribute weighted sum are defined as data meeting the predetermined condition. The embodiment of the disclosure does not make a limitation on the specific sizes of T, L, M, N and W, or their setting manners. In practice, the attribute weights can be set depending on specific conditions, for example, the valid time period T determines the timeliness for data; the number L of users that have browsed the data, the number of times N that the data have been browsed and the number of times M that the data have been commented determine the concern degree of the data. When the data with high timeliness is pushed, the weight p1 of the valid time period T can be set to be higher. When the data with high concern degree is pushed, the weight p2 of the number L of users that have browsed the data, the weight p3 of the number of times N that the data have been browsed and the weight p4 of the number of times M that the data have been commented can be set to be higher.

In the embodiment of the disclosure, for example, when data with high timeliness are pushed, p1=0.5, p2=0.3, p3=0.1 and p4=0.1; a user receives n pieces of data $m_1 \ldots m_n$ within a day; the current moment is 18:00; the attribute weighted sums of the n pieces of data are calculated respectively. For example, for data m1 generated at 17:30, there were 10 users $a_1 \ldots a_{10}$ that browsed the data m1 during the time period of 17:30 to 18:00. Specifically, the user $a_1$ browsed for 5 times and commented for 2 times, each of the users $a_2 \ldots a_{10}$ browsed for once and commented for once. Therefore, the four attributes of the data $m_1$ are that: $T_1$=30 (in the unit of minute), $L_1$=10, $N_1$=14 and $M_1$=11; the attribute weighted sum $B_1$ of the data $m_1$ meets $B_1$=30*0.5+10*0.3+14*0.1+11*0.1=20.5. Similarly, the attribute weighted sums $B_2 \ldots B_n$ of the data $m_2 \ldots m_n$ are calculated respectively; then the data with a highest attribute weighted sum is selected as the data meeting the predetermined condition. If the attribute weighted sum $B_1$ of the data $m_1$ is highest, the value of W is 1. That is, if the data with the highest attribute weighted sum is taken as the data meeting the predetermined condition, the data $m_1$ is the data meeting the predetermined condition.

Step 202: determining reading-performed-users that have browsed the data meeting the predetermined condition and acquiring attributes of the reading-performed-users;

Specifically, still taking the data $m_1$ meeting the predetermined condition acquired in Step 201 as an example, the users having browsed the data $m_1$ are selected as reading-performed-users, and the attributes of the reading-performed-users having browsed the data $m_1$ are acquired respectively; the disclosure does not limit the attributes of the reading-performed-users, wherein the attributes can be inherent attributes of the reading-performed-users, such as gender, age, birth place, school, vocation, etc.; also can be relationship chain attributes such the relationship between the reading-performed-users and a user receiving the data $m_1$.

In the embodiment of the disclosure, for example, the number of reading-performed-users is 10, and the attribute of the reading-performed-users is the gender of the reading-performed-users and the relationship between the reading-performed-users and the user receiving the data $m_1$; the attributes of each of the reading-performed-users are shown in Table 1.

TABLE 1

| Reading-performed-users that have browsed data $m_1$ | Gender | Relationship between reading-performed-user and user receiving data $m_1$ |
| --- | --- | --- |
| 1 | Male | High school classmate |
| 2 | Male | High school classmate |
| 3 | Female | High school classmate |
| 4 | Female | High school classmate |
| 5 | Male | College classmate |
| 6 | Male | High school classmate |
| 7 | Male | High school classmate |
| 8 | Female | High school classmate |
| 9 | Female | High school classmate |
| 10 | Male | College classmate |

In addition, all of the attributes of all of the reading-performed-users may be acquired, or in the case that a precondition has been set, only attributes of the reading-performed-users meeting a preset precondition may be acquired. For example, if a precondition is set as male, only attributes of the male reading-performed-users are acquired.

Step 203: determining a common attribute of the reading-performed-users;

Specifically, for any attribute of the reading-performed-users, any sub-attribute in the attribute is acquired; the users that have the sub-attribute are counted; it is determined whether the number of the users is greater than a preset threshold, and if the number of the users is greater than the preset threshold, the sub-attribute is determined as the common attribute. Here, as shown in table 1, the attributes of the reading-performed-users includes the gender of the reading-performed-users and the relationship between the reading-performed-users and the user receiving data $m_1$. For the attribute "gender of reading-performed-user", its sub-attributes include "Male" and "Female"; for the attribute "Relationship between reading-performed-user and user receiving data $m_1$", the sub-attributes include "High school classmate" and "College classmate". When the users having each of the sub-attributes are counted, a cluster analysis may be conducted on the respective sub-attribute and a count result list may be established; according to the count result list, the common attribute of the reading-performed-users may be determined.

In the following exemplary description, the common attribute of the reading-performed-users is determined based on all relationship chain attributes of the reading-performed-users. For example, a count result list for the data $m_1$ is established as shown in table 2, in which a cluster analysis is conducted on each of the sub-attributes of the attribute "relationship between reading-performed-user and user receiving data $m_1$", based on the attributes of the reading-performed-users that have browsed the data $m_1$ as shown in table 1.

TABLE 2

| Relationship between reading-performed-user and user receiving data $m_1$ | Number of users |
|---|---|
| High school classmate | 8 |
| College classmate | 2 |

Preferably, after the users that have the sub-attribute are counted and the count result list is established, in determining the common attribute of the reading-performed-users according to the count result list, a threshold may be preset, for determining whether the number of the users that have the sub-attribute is greater than the preset threshold. If the number of the users that have the sub-attribute is greater than the preset threshold, the sub-attribute is determined as the common attribute.

The preset threshold may be set depending on specific conditions. In order to extract more valuable reading-not-performed-users and make the determined common attribute more useful, the preset threshold can be set to be higher. The embodiment of the disclosure does not limit the manner of setting a preset threshold, for example, based on Table 2, if the preset threshold is 5, the sub-attribute "High school classmates" in the determined attribute "Relationship between reading-performed-user and user receiving data $m_1$" is taken as the common attribute.

It should be noted that the embodiment above is illustrated by the relationship chain attribute only, the implementation of inherent attributes is the same as that of the relationship chain attribute, and the description is thus omitted here. The preset threshold also can be set in a form of percentage; in determining the common attribute, after the users having any sub-attribute are counted, the percentage of the number of users in the number of reading-performed-users is calculated; and then the calculated result is compared with the preset threshold.

For example, if a preset threshold is 80%, as shown in Table 2, for the sub-attribute "High school classmate" in the attribute "Relationship between reading-performed-user and user receiving data $m_1$", the corresponding number of users is 80% of the number of the reading-performed-users; and the number of users corresponding to the other sub-attribute "College classmates" is 20% of the number of the reading-performed-users, then the sub-attribute "High school classmate" is determined as the common attribute.

Wherein, the manner of determining the common attribute is determined only according to the relationship between the number of users corresponding to each of the attributes and the preset threshold, that is, the common attribute is determined in the attributes of the reading-performed-users acquired in Step 202 first, then the corresponding same attribute for which number of users meets the preset threshold is determined as the common attribute of the reading-performed-users.

Further, since the attribute is divided into an inherent attribute and a relationship chain attribute, after the common attributes are determined according to the method above, a selection can be performed among the determined common attributes according to the type of the common attribute, for example, in the common attributes determined according to the method above, the common attribute belonging to the inherent attribute is picked out and is determined as the final common attribute, or the common attribute belonging to the relationship chain attribute is picked out and is determined as the final common attribute; the disclosure does not make a limitation.

Optionally, in determining the common attribute of the reading-performed-users, besides the above manner of first determining the same attributes meeting a preset threshold and then performing a selection according to the attribute type and determining the final common attribute, the following manner can be adopted: after the same attributes are determined, the same attributes can be first divided into a coherent attribute and a relationship chain attribute based on the attribute type, and the same attributes of one type of the coherent attribute and relationship chain attribute are determined as the common attribute; on that basis, after determining which type of the same attributes is the common attribute, it is determined whether this type of the same attributes reaches a threshold, and if it reaches the threshold, the same attribute is determined as the common attribute.

In practice, to further ensure the accuracy of data pushing, the common attribute can be determined based on a combination of a plurality of attributes, wherein the specific process of determining the common attribute of the reading-performed-users comprises the steps of: in the attributes of the reading-performed-users, determining attributes to be combined, acquiring any sub-attribute in any attribute, combining the acquired sub-attributes according to the attributes to be combined to obtain combined sub-attributes, counting the users having any combined sub-attribute of the combined sub-attributes and determining whether the number of the users having the any combined sub-attribute is greater than a preset threshold, and if the number is greater than the preset threshold, determining the any combined sub-attribute as the common attribute.

Hereinafter, descriptions are provided on for example, determining the common attribute of the reading-performed-users according to all relationship chain attributes and gender attributes of the reading-performed-users. For example, for data $m_1$, according to the attributes of the reading-performed-users that have browsed the data $m_1$ as shown in Table 1, a count result list is established as shown in Table 3, in which a cluster analysis on each of the combined sub-attributes, which are combinations of the gender of the reading-performed-user and the relationship between the reading-performed-user and the user receiving the data $m_1$, is performed.

TABLE 3

| Gender of reading-performed-user and relationship between reading-performed-user and user receiving data $m_1$ | Number of users |
|---|---|
| Male high school classmates | 4 |
| Female high school classmates | 4 |
| Male college classmates | 2 |
| Female college classmates | 0 |

Preferably, after the users having the any combined sub-attribute are counted and the count result list is established, in determining the common attribute of the reading-performed-users according to the count result list, a threshold can be preset and it is determined whether the number of the users having the any combined sub-attribute is greater than the preset threshold, if the number is greater than the preset threshold, the any combined sub-attribute is determined as the common attribute.

Step 204: selecting reading-not-performed-users that have the common attribute and have not browsed the data;

Specifically, the users that have the common attribute and have not browsed the data can be determined first. Therefore, the reading-not-performed-users that might be interested in the data meeting a certain predetermined condition and have not browsed the data meeting the predetermined condition can be selected, according to the common attribute among the attributes of the reading-performed-users that have browsed the data meeting the predetermined condition.

It should be noted that the common attribute can be divided into inherent attribute and relationship chain attribute. In Step 203, the manners of determining the common attribute are described in several different cases. When the common attribute determined in Step 203 is an inherent attribute, it may be considered that the reading-not-performed-users selected in Step 204 have no relationship with the user receiving the data $m_1$. When the common attribute determined in Step 203 is a relationship chain attribute, it may be considered that the reading-not-performed-users selected in Step 204 have a relationship with the user receiving the data $m_1$.

Further, if there is no restriction on the type of the common attribute in determining the common attribute in Step 203 except for being a same attribute for all of the reading-performed-users, the reading-not-performed-users selected might have a relationship with the user receiving the data $m_1$, or might have no relationship with the user receiving the data $m_1$. In this case, reading-not-performed-users that have a relationship with the users receiving the data $m_1$ can be reselected from the selected reading-not-performed-users. The embodiment does not specifically make a limitation on the manner of selecting reading-not-performed-users. For example, if the data $m_1$ meeting the predetermined condition is to be pushed to the reading-not-performed-users that have a relationship with the user receiving the data $m_1$, the relationship chain attribute can be determined as the type of the common attribute in Step 203 of determining the common attribute, thereby enabling the reading-not-performed-users selected in Step 204 to have a relationship with the user receiving the data $m_1$.

For example, if the common attribute determined in Step 203 is the relationship chain attribute "High school classmate", users that have the attribute "High school classmate" and have not browsed the data $m_1$ meeting the predetermined condition are selected as reading-not-performed-users. Thus, it can be seen that the selected reading-not-performed-users have a relationship of "High school classmate" with the user receiving the data $m_1$.

Preferably, when there are a plurality of common attributes of the reading-performed-users determined in Step 203, for each of the common attributes, corresponding reading-not-performed-users can be selected, that is, for each of common attributes, the users that have this common attribute and have not browsed the data are selected as corresponding reading-not-performed-users; also, the users that meet all of the plurality of common attributes and have not browsed the data meeting the predetermined condition can be selected as reading-not-performed-users.

Step 205: pushing the data meeting the predetermined condition to the reading-not-performed-users.

In Step 205, the embodiment does not make a limitation on the specific way of pushing. For example, the data $m_1$ meeting the predetermined condition can be pushed to the reading-not-performed-users through instant messages, real-time Web data or emails, etc.

Preferably, before pushing the data meeting the predetermined condition to the reading-not-performed-users, it may be determined whether the data have been pushed to the reading-not-performed-users, if the data have been pushed to the reading-not-performed-users, pushing is ended; otherwise, the data are pushed to the reading-not-performed-users.

The preferred embodiment is to avoid the repeated pushing of the same data meeting the predetermined condition to the reading-not-performed-users.

When the operation of pushing data is completed, the reading-not-performed-users' feedback to the data meeting the predetermined condition also can be tracked and the weights of the data attributes can be adjusted according to the feedback.

According to the method provided by the embodiment of the disclosure, the reading-not-performed-users that have the common attribute and have not browsed the data may be selected based on the data that meet a predetermined condition and a common attribute of the reading-performed-users, and the data are pushed to the reading-not-performed-users. Thus, an accurate pushing to the reading-not-performed-users may be implemented, enabling the reading-not-performed-users to accurately acquire their interesting data.

Embodiment 3

Referring to FIG. 3, the embodiment of the disclosure provides a device for pushing data. The device includes:

a common attribute acquisition module 301, configured to acquire data which meet a predetermined condition, to acquire attributes of reading-performed-users that have browsed the data, and to determine a common attribute of the reading-performed-users;

an reading-not-performed-user selection module 302, configured to select reading-not-performed-users that have the common attribute and have not browsed the data; and a pushing module 303 configured to push the data to the reading-not-performed-users.

According to the device provided by the embodiment of the disclosure, the reading-not-performed-users that have the common attribute and have not browsed the data may be selected based on the data that meet a predetermined condition and a common attribute of the reading-performed-users, and the data are pushed to the reading-not-performed-users. Thus, the reading-not-performed-users may acquire their interesting data accurately.

Embodiment 4

The embodiment of the disclosure provides a device for pushing data. The device includes:

a common attribute acquisition module, configured to acquire data which meet a predetermined condition, to acquire attributes of reading-performed-users that have browsed the data, and to determine a common attribute of the reading-performed-users;

an reading-not-performed-user selection module configured to select reading-not-performed-users that have the common attribute and have not browsed the data;

a pushing module configured to push the data to the unread users;

The common attribute acquisition module comprises: a sub-attribute acquisition unit, a counting unit and a determination unit, wherein the sub-attribute acquisition unit is configured to acquire any sub-attribute in any attribute from the attributes of the reading-performed-users;

the counting unit is configured to count users that have the any sub-attribute;

the determination unit is configured to determine whether a number of the users is greater than a preset threshold, and to determine the any sub-attribute as the common attribute if the number of the users is greater than the preset threshold.

In addition, the sub-attribute acquisition unit may be further configured to determine attributes to be combined, to acquire any sub-attribute in any attribute, to combine the acquired sub-attributes based on the attributes to be combined, to acquire a combined sub-attribute;

the counting unit may be further configured to count users that have the combined sub-attribute;

the counting unit may be further configured to determine whether a number of the users is greater than a preset threshold, and to determine the arbitrarily combined sub-attribute as the common attribute if the number of the users is greater than the preset threshold.

The reading-not-performed-user selection module comprises:

a determination unit and a reading-not-performed-user selection module, wherein the determination unit is configured to determine the users that have the common attributes, and the reading-not-performed-user selection module is configured to select the users that have the common attribute and have not browsed the data as the reading-not-performed-users.

the reading-not-performed-user selection module may be further configured, when the common attribute comprises a plurality of common attributes, to select, for each of the common attributes, the users that have the common attribute and have not browsed the data as reading-not-performed-users corresponding to the common attribute; or the reading-not-performed-user unit may be further configured when the common attribute comprises a plurality of common attributes, to select, for each of the common attributes, the users that have the common attribute and have not browsed the data as reading-not-performed-users corresponding to the common attribute; or to select the users that have the plurality of common attributes and have not browsed the data that meet the predetermined condition as reading-not-performed-users.

The unread user unit is further configured to further select unread users who have a relationship with the read users from the selected unread users.

Specifically, the pushing module can push the data to the users through instant messages, real-time Web data or emails, etc., and the embodiment of the disclosure does not make such a limitation.

Further, the device comprises:

a filtering module, configured to determine whether the data has been pushed to the reading-not-performed-users; to end pushing if the data has been pushed to the reading-not-performed-users; and to trigger the pushing module otherwise.

According to the device provided by the embodiment of the disclosure, the reading-not-performed-users that have the common attribute and have not browsed the data may be selected based on the data that meet a predetermined condition and a common attribute of the reading-performed-users, and the data are pushed to the reading-not-performed-users. Thus, an accurate pushing to the reading-not-performed-users may be implemented, enabling the reading-not-performed-users to accurately acquire their interesting data.

It is to be noted that, the device for pushing data provided by the embodiment above, in pushing the data, is illustrated just by taking the above respective functional modules as an example. In practice, the function above can be distributed to be implemented by different functional modules as needed. That is, the internal structure of the device is divided into different functional modules to perform all or parts of the functions as described above.

Additionally, the device for pushing data provided by the embodiment above and the method embodiment for pushing data belong to a same conception. Referring to the method embodiment, the implementation process of the device is similar, and thus the detailed description will be omitted here.

All or some of the contents in the technical solution provided by the embodiments above can be implemented by software programming, wherein the software program may be stored in a readable storage medium, such as a hard disk in a computer, a disc or a floppy disk.

The above description involves only the preferred embodiments of the disclosure and is not intended to limit the disclosure. Any modification, equivalent substitution and improvement within the spirit and principle of the disclosure should be considered as within the protection scope of the disclosure.

The invention claimed is:

1. A method for pushing data, comprising:
acquiring data which meet a predetermined condition;
acquiring attributes of reading-performed-users that have browsed the data;
determining a common attribute of the reading-performed-users;
selecting reading-not-performed-users that have the common attribute and have not browsed the data; and
pushing the data to the reading-not-performed-users,
wherin the determining the common attribute of the reading-performed-user comprises:
determining attributes to be combined from the attributes of the reading-performed-users;
acquiring any sub-attribute in any attribute;
combining the acquired sub-attributes based on the attributes to be combined, to acquire combined sub-attributes;
counting users that have any combined sub-attribute of the combined sub-attributes;
determining whether a number of the users that have the any combined sub-attribute is greater than a preset threshold; and
when the number of the users that have the any combined sub-attribute is greater than the preset threshold, determining the any combined sub-attribute as the common attribute.

2. The method for pushing data according to claim 1, wherein the selecting reading-not-performed-users that have the common attribute and have not browsed the data comprises:
determining users that have the common attribute; and
selecting users that have the common attribute and have not browsed the data as the reading-not-performed-users.

3. The method for pushing data according to claim 2, further comprising:
after selecting users that have the common attribute and have not browsed the data as the reading-not-performed-users, reselecting, from the selected reading-not-performed-users, reading-not-performed-users that have relationship with the reading-performed-users.

4. The method for pushing data according to claim 1, wherein the selecting reading-not-performed-users that have the common attribute and have not browsed the data comprises:
when the common attribute comprises a plurality of common attributes,
determining users that have the common attributes, and for each of the common attributes, selecting users that have the common attribute and have not browsed the data as reading-not-performed-users corresponding to the common attribute; or selecting users that have all of the plurality of common attributes and have not browsed the data that meet the predetermined condition as reading-not-performed-users.

5. The method for pushing data according to claim 1, further comprising:
before pushing the data to the reading-not-performed-users,
determining whether the data has been pushed to the reading-not-performed-users; and ending pushing when the data has been pushed to the reading-not-performed-users.

6. A device for pushing data, comprising:
a common attribute acquisition module, stored in a memory and executed by a processor, and configured to acquire data which meet a predetermined condition, to acquire attributes of reading-performed-users that have browsed the data, and to determine a common attribute of the reading-performed-users;
a reading-not-performed-user selection module, stored in a memory and executed by a processor, and configured to select reading-not-performed-users that have the common attribute and have not browsed the information data; and
a pushing module, stored in a memory and executed by a processor, and configured to push the data to the reading-not-performed-users,
wherein the common attribute acquisition module comprises:
a sub-attribute acquisition unit, configured to determine attributes to be combined, to acquire any sub-attribute in any attribute, and to combine the acquired sub-attributes based on the attributes to be combined, so as to acquire combined sub-attributes;
a counting unit, configured to count users that have any combined sub-attribute of the combined sub-attributes; and
a determination unit, configured to determine whether a number of the users is greater than a preset threshold, and to determine the any combined sub-attribute as the common attribute when the number of the users is greater than the preset threshold.

7. The device for pushing data according to claim 6, wherein the reading-not-performed-user selection module comprises:
an attribute determination unit, configured to determine users that have the common attributes, and
a reading-not-performed-user unit, configured to determine users that have the common attribute and have not browsed the data as the reading-not-performed-users.

8. The device for pushing data according to claim 7, wherein
the reading-not-performed-user unit is further configured to reselect, from the selected reading-not-performed-users, reading-not-performed-users that have relationship with the reading-performed-users.

9. The device for pushing data according to claim 6, wherein the reading-not-performed-user selection module comprises:
an attribute determination unit, configured to determine users that have the common attributes, and
an reading-not-performed-user unit, configured, when the common attribute comprises a plurality of common attributes, to select, for each of the common attributes, users that have the common attribute and have not browsed the data as reading-not-performed-users corresponding to the common attribute; or to select users that have all of the plurality of common attributes and have not browsed the data that meet the predetermined condition as reading-not-performed-users.

10. The device for pushing data according to claim 6, further comprising:
a filtering module, stored in a memory and executed by a processor, and configured to determine whether the data has been pushed to the reading-not-performed-users and to end pushing when the data has been pushed to the reading-not-performed-users.

* * * * *